United States Patent [19]

Hara et al.

[11] Patent Number: 4,975,716
[45] Date of Patent: Dec. 4, 1990

[54] THERMAL DEVELOPMENT IMAGE FORMING APPARATUS

[75] Inventors: Kirotaka Hara, Hachioji; Kazuhiro Sugawara, Hino, both of Japan

[73] Assignee: Konica Corporation, Tokyo, Japan

[21] Appl. No.: 302,713

[22] Filed: Jan. 27, 1989

[30] Foreign Application Priority Data

Jan. 29, 1988 [JP] Japan .................................. 63-17186
Apr. 27, 1988 [JP] Japan .................................. 63-102452
Apr. 27, 1988 [JP] Japan .................................. 63-102453

[51] Int. Cl.$^5$ .......................... G01D 9/00; G01D 9/42
[52] U.S. Cl. ................................. 346/25; 346/107 R; 346/108; 271/242; 271/243; 271/245; 271/248; 271/250
[58] Field of Search ...................... 346/25, 108, 107 R; 271/242, 245, 246, 248, 250, 243

[56] References Cited

U.S. PATENT DOCUMENTS 4,621,802 11/1986 Ishida et al. ......................... 271/242
4,844,443 7/1989 Trafton ................................. 271/245

FOREIGN PATENT DOCUMENTS 61-18951   1/1986  Japan .
61-153651  7/1986  Japan .
61-184544  8/1986  Japan .
61-184545  8/1986  Japan .
62-201433  9/1987  Japan .
62-249164 10/1987  Japan .
62-253140 11/1987  Japan .
63-159852  7/1988  Japan .

Primary Examiner—Bruce A. Reynolds
Assistant Examiner—Huan Tran
Attorney, Agent, or Firm—Finnegan, Henderson, Farabow, Garrett, and Dunner

[57] ABSTRACT

A thermal development image forming apparatus includes an exposure section, an overlapping section, a developing/transfer section, a sheet separating section, and a correcting section. The exposure section forms a latent image by exposing a photosensitive sheet. The overlapping section overlaps the exposed photosensitive sheet on an image-receiving sheet. The developing/transfer section heats/presses the overlapped sheets so as to develop the latent image on the photosensitive sheet and transfer the developed image onto the image-receiving sheet. The sheet separating section separates the photosensitive sheet from the image-receiving sheet image upon image development/transfer. The correcting section for correcting skews of the sheets in a feed direction is arranged in a step prior to that of the sheet separating section.

13 Claims, 9 Drawing Sheets

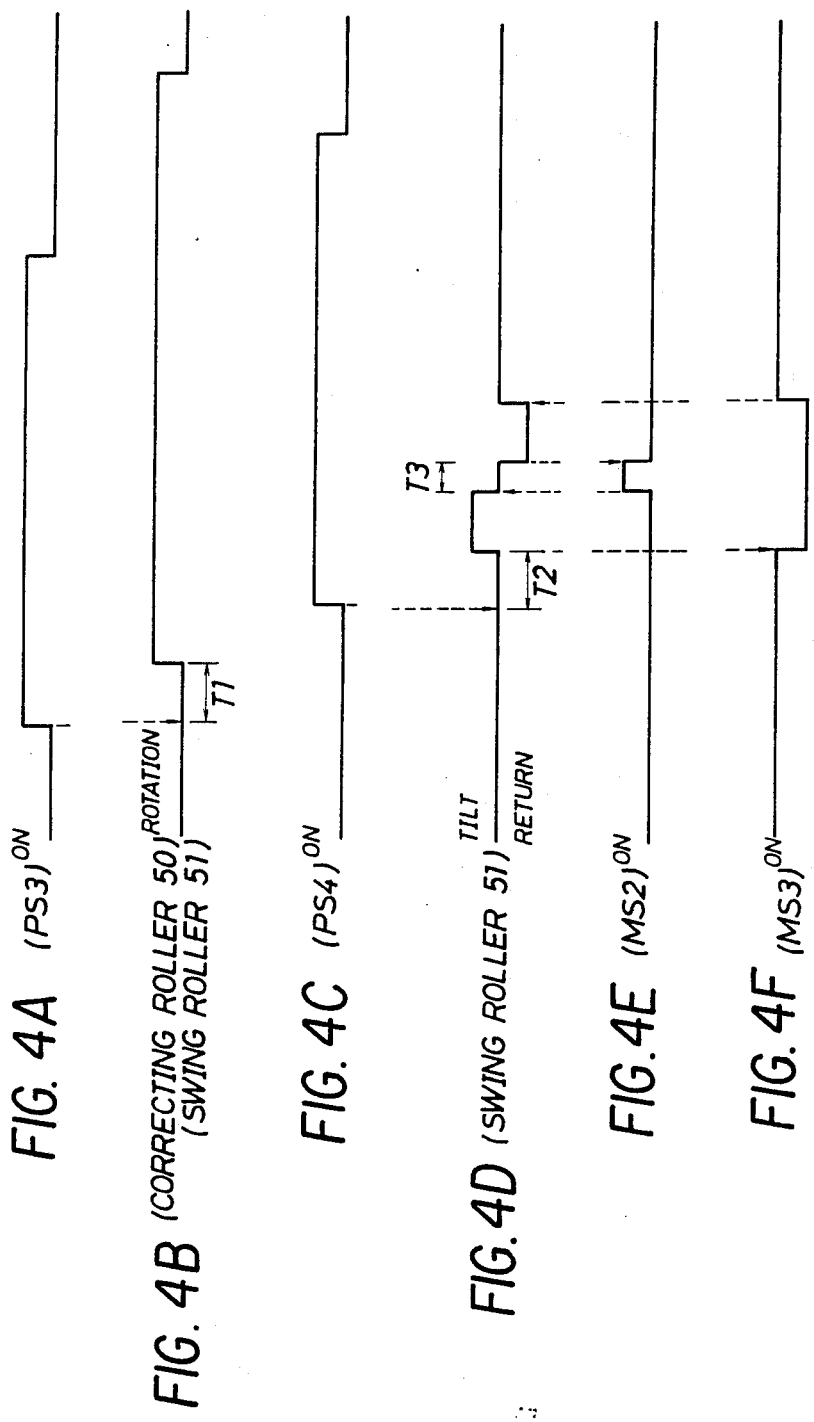

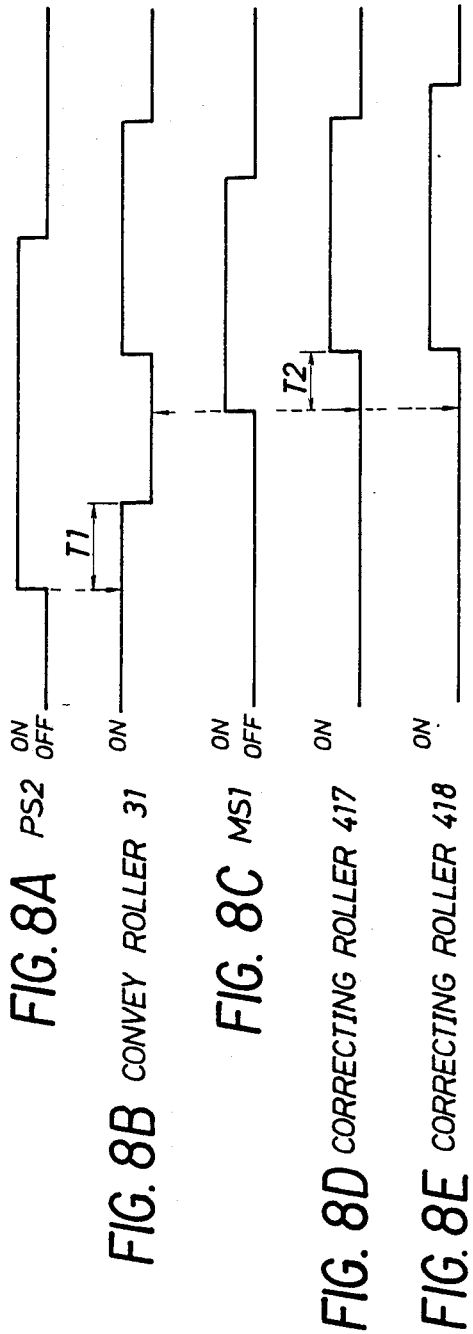
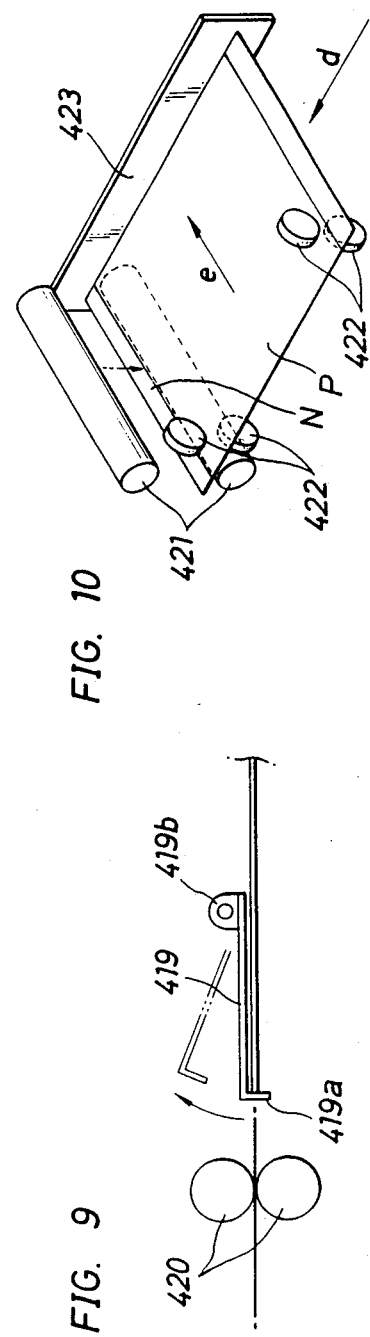
FIG. 8A PS2
FIG. 8B CONVEY ROLLER 31
FIG. 8C MS1
FIG. 8D CORRECTING ROLLER 417
FIG. 8E CORRECTING ROLLER 418
FIG. 9
FIG. 10

THERMAL DEVELOPMENT IMAGE FORMING APPARATUS

BACKGROUND OF THE INVENTION

The present invention relates to a thermal development image forming apparatus having a sheet correcting unit for correcting positions or directions of overlapped thermal development/transfer sheets.

A method of obtaining a color image by releasing a diffusion pigment by thermal development, and separating a silver image from the pigment by transferring the pigment onto an image-receiving element has already been proposed. In addition, a variety of techniques associated with photosensitive elements, image-receiving elements, a thermal development method, and apparatuses therefor have been disclosed.

As an apparatus using such a development method, a dry color hard copying machine disclosed in, e.g., Japanese Patent Laid-Open (Kokai) No. 62-201433 or the like is proposed. According to this apparatus, a color image is formed on an image receiving sheet in the following manner. A latent image is formed first by exposing a photosensitive element coated on a photosensitive sheet. The photosensitive sheet is overlapped on the image-receiving sheet, and the sheets are clamped between a rotary drum and an endless belt which is urged against the drum. A diffusion pigment of an image portion is then released from the photosensitive sheet by heating and pressing the sheets, and the sheets are separated upon transfer of an image onto the image-receiving sheet.

As described above, in the final process, both the sheets are separated. Various separation schemes are employed. For example, Japanese Patent Laid-Open (Kokai) No. 61-18951 discloses an automatic separating unit, as shown in FIG. 5.

In this apparatus, the width of an image-receiving sheet P1 is set to be greater than that of a photosensitive sheet N1. In addition, the sheets N1 and P1 are overlapped while the leading end of the sheet N1 is caused to protrude from that of the sheet P1. When the leading end of the sheet N1 reaches a position above a separating roller 1, the roller 1 is quickly moved upward, thus separating the sheet N1 from the sheet P1. In this case, both the sides of the sheet P1 are clamped/supported by two pairs of clamping rollers 2 and 2' so as to allow the sheet P1 to resist a separating force acting on the sheet N1.

According to a separating unit proposed in Japanese Patent Laid-Open (Kokai) NO. 63-159850 by the present inventor, as shown in FIG. 6, a protrusion 3 is formed at a central leading portion of a photosensitive sheet N2 in advance, and the protrusion 3 is caused to protrude from a leading end 4 of an image-receiving sheet P2 and the leading end 4 is caused to protrude from leading portions 3a on both the sides of the protrusion 3 when the sheets N2 and P2 are overlapped. Separation of the sheets N2 and P2 upon completion of thermal development/transfer is performed as follows. The central leading portion (protrusion) 3 of the sheet N2 is clamped by a feed roller pair (not shown) after the sheets N2 and P2 pass through pressing rollers 5 and 6. At the same time, both side leading portions 4a of the sheet P2 are positioned under wedge-like separators 7 and 7'. The feed roller pair clamping the central leading portion 3 is moved upward, and the separators 7 and 7' are moved downward. That is, separation of the sheets N2 and P2 is performed from their leading portions by using the pressing rollers as pressing members for resisting a separating force. The separation of the sheets N2 and P2 is continued afterwards while a feed speed is increased.

In each separation scheme, in order to properly perform separation, overlapped sheets must be sent in a separating unit in a proper direction. If the sheets are not properly positioned, troubles, such as a jam and incomplete separation of the overlapped sheets, may be caused.

In addition, in the conventional apparatuses, a sheet fed in a thermal developing section tends to be incorrectly positioned, and hence is skewed from a feed direction by, e.g., 2 mm. Development and transfer are often performed in such a state. As a result, degradation in appearance due to misregistration of an image transferred onto an image-receiving sheet or degradation in sheet separation precision upon transfer frequently occurs as well as other troubles.

SUMMARY OF THE INVENTION

It is a first object of the present invention to provide a thermal development image forming apparatus having a correcting unit for correcting incorrect positions of overlapped sheets when the overlapped sheets are sent to a separating unit.

It is a second object of the present invention to provide a thermal development image forming apparatus having a correcting unit for correcting skews of photosensitive and image-receiving sheets, which are fed in a thermal developing section, independently or in an overlapped state.

BRIEF DESCRIPTION OF THE DRAWINGS

FIG. 4 is a timing chart for explaining an operation of the meander correcting/separating section;

FIG. 8 is a timing chart for explaining an operation of the unit according to the second embodiment of the present invention;

FIG. 9 is a view for explaining a meander correcting unit according to a third embodiment of the present invention;

FIG. 10 is a view for explaining a meander correcting unit according to a fourth embodiment of the present invention;

DETAILED DESCRIPTION OF THE PREFERRED EMBODIMENTS

Figure 1:
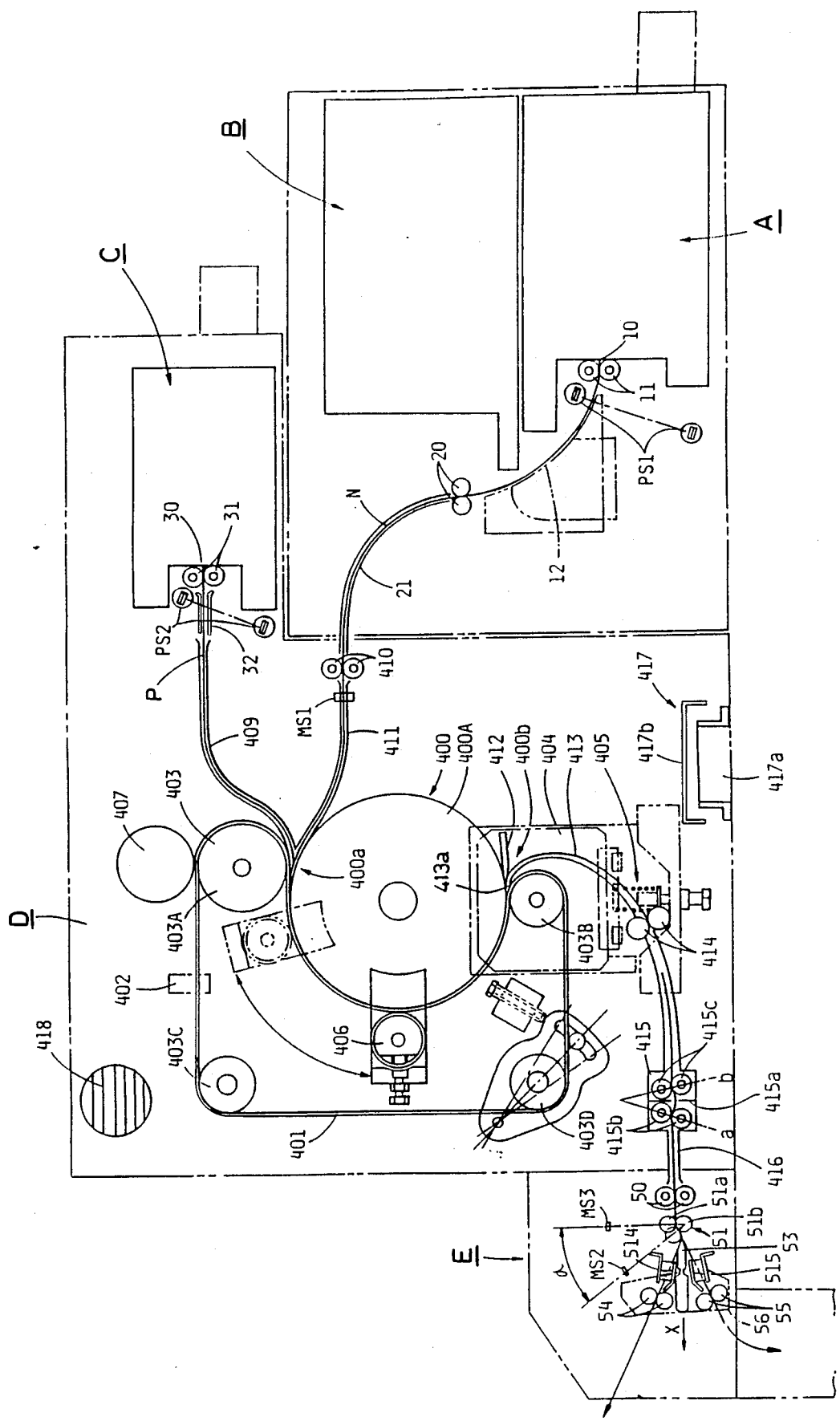
FIG. 1 is a view showing an arrangement of a thermal development image forming apparatus according to an embodiment of the present invention.

A thermal development image forming apparatus according to an embodiment of the present invention will be described below. FIG. 1 shows an overall arrangement of the thermal development image forming apparatus. Referring to FIG. 1, reference symbol A denotes a thermal developable photosensitive medium feed device for storing photosensitive sheets N as thermal developable photosensitive media and feeding them through a feed port 10. A first feed roller pair 11 for feeding each photosensitive sheet N, a photosensor PS1 for detecting the fed photosensitive sheet N, a first guide 12 for guiding the sheet N in a predetermined direction, and the like are arranged near the outside of the feed port 10.

Reference symbol B denotes an exposure device arranged above the thermal developable photosensitive medium feed device A. The device B scans the photosensitive sheet N passing through the first guide 12 with light modulated by an image signal by using an incorporated FOT (Fiber Optic Tube) or the like. A CRT, a laser, an LED, a combination of a liquid crystal shutter and a light source, or the like may be used as a light source for exposure. Instead of the above-mentioned light scanning, the entire surface of a photosensitive material may be simultaneously exposed to record an image thereon.

Reference numeral 20 denotes a feed roller pair; and 21, a second guide. They are used to feed the exposed photosensitive sheet N to a predetermined position.

Reference symbol C denotes an image-receiving element feed device for storing image-receiving sheets P and automatically feeding them through a feed port 30. A third feed roller pair 31 for feeding each sheet P, a third guide 32 for guiding the sheet P in a predetermined direction, a photosensor PS2 for detecting the sheet P on the guide 32, and the like are arranged near the outside of the feed port 30.

Reference symbol D denotes a thermal development/transfer device for developing the exposed photosensitive sheet N and transferring the developed image onto the image-receiving sheet P. Reference numeral 400 denotes a rotary drum unit rotatably arranged at a central portion of the device D; and 401, an endless belt urged/wound against/around substantially the half of the outer periphery of the rotary drum unit 400. The endless belt is pivoted upon rotation of the rotary drum unit 400 at the same speed as that of the unit 400.

Figure 2:
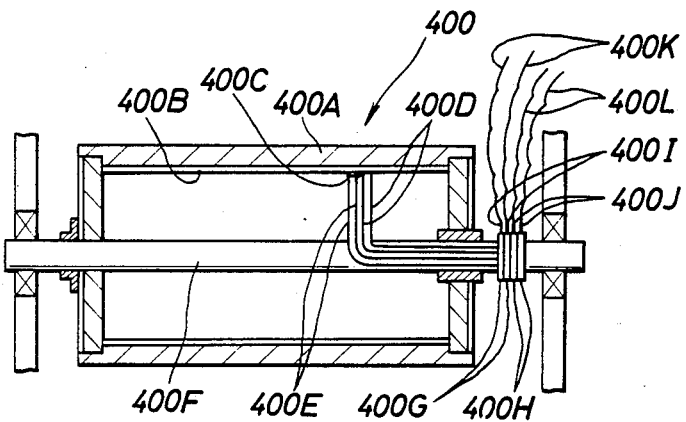
FIG. 2 is a sectional view of a rotary drum.

A rotary drum 400A as a main part of the rotary drum unit 400 is required to have heat resistance and a smooth surface. The drum 400A is constituted by a cylindrical aluminum member having a Teflon-coated surface, a member consisting of a metal other than aluminum, such as iron, and stainless steel, a heat-resistant plastic member, or the like. When the aluminum member is used, it is required to have a thickness of 5 mm or more so as to have a sufficient heat capacity. In addition, silicone rubber members are bonded to both the end faces of the rotary drum 400A so as to constitute a heat insulating structure. Asbestos, Bakelite, or any other material having a large heat capacity can be effectively used as a heat insulating material. A heater (e.g., 800 W) 400B is mounted in the rotary drum 400A as shown in FIG. 2, so that the inside of the drum 400A can be heated from a room temperature to 200° C. The heater 400B may be selected from various types of heaters. For example, a sheet heater (a heating pattern is formed in a silicone rubber member) may be used. Note that the heater 400B preferably performs a heating operation so as to achieve a uniform temperature distribution of an actually used portion of the rotary drum 400A. In addition, a temperature sensor 400C is mounted in the drum 400A so as to allow servo control of an internal temperature.

Reference symbol 400D denotes two wiring lines for supplying power to the heater 400B; and 400E, two wiring lines for transmitting a signal from the temperature sensor 400C. These wiring lines 400D and 400E are respectively connected to two pairs of rotary electrodes 400G and 400H attached around a shaft 400F for rotatably supporting the rotary drum 400A, and are respectively connected to two pairs of external wiring lines 400K and 400L through two pairs of brushes 400I and 400J which are brought into slidable contact with the rotary electrodes 400G and 400H.

The endless belt 401 is made of Normex fiber and Kevlar fiber (available from Du Pont de Nemours, E.I., Co.) having heat and tension resistance. A silicon rubber member or the like is bonded to the surface of the endless belt 401 so as to increase a frictional coefficient. Alternatively, the endless belt 401 may be constituted by a material having a predetermined frictional coefficient, such as a carbon-containing silicone rubber having heat-resistant fiber as a core or a fluorine rubber. A heater 402 for heating the belt 401 is arranged at a proper position on a line along which the belt 401 is pivoted. With this arrangement, the belt 401 is heated so as to prevent variations in development condition due to a sudden drop in temperature.

Reference numeral 403 denotes a group of rollers for pivotally supporting the endless belt 401. The group of rollers 403 is constituted by an inlet roller 403A located at a feed-in portion 400a of the rotary drum 400A, an outlet roller 403B located at a feed-out portion 400b of the drum 400A, a holding roller 403C located apart from the drum 400A, a tension adjusting roller 403D, and the like.

A driving motor 404 is attached to the outlet roller 403B, so that the roller 403B serves as a driving source and rotates or pivots the belt 401, the rollers 403, and the drum 400A.

The outlet roller 403B and the driving motor 404 are urged by a pressing mechanism 405 as a whole toward the rotary drum 400A side. As a result, the roller 403B is urged against the drum 400A through the belt 401. Note that the urging force can be adjusted.

The tension adjusting roller 403D adjusts the tension of the belt 401 by changing its position within a certain range. If crowning rollers are used as the tension adjusting roller 403 and the holding roller 403C, meander of the belt 401 due to thermal expansion and the like can be effectively prevented.

Since each of the rollers 403 is required to have a large frictional coefficient, its surface is constituted by a silicone rubber, a neoprene rubber, or the like.

Reference numeral 406 denotes a pressing roller whose position can be changed within a range from a position near the feed-in portion 400a of the rotary drum 400A to a position near the middle point between the feed-in portion 400a and the feed-out portion 400b of the drum 400A. The roller 406 is set at an optimal position in accordance with a humidity and a temperature of the air. This positioning may be automatically performed by detecting a humidity. The roller 406 is designed to clamp the belt 401 and urge it against the drum 400A at the set position.

Since the pressing roller 406 is also required to have a large frictional coefficient in relation to the belt 401 and proper elasticity, it is constituted by a silicon rubber member, a neoprene rubber member, or the like.

Reference numeral 407 denotes a cleaning roller arranged above the inlet roller 403A. An adhesive feather, brush, or the like is formed on the surface of the cleaning roller 407. The roller 407 is rotated when it is brought into contact with the belt 401, so that residual small sheet pieces, dust, and the like on the belt 401 are cleaned.

Reference numeral 409 denotes a fourth guide which is arranged between the third guide 32 and the feed-in portion 400a of the rotary drum 400A, and serves to guide the image-receiving sheet P to the feed-in portion 400a of the drum 400A.

Similarly, a fifth feed roller pair 410 is arranged at the outlet side of the second guide 21, and a fifth guide 411 is arranged between the feed roller pair 410 and the feed-in portion 400a of the rotary drum 400A. The fifth feed roller pair 410 and the fifth guide 411 serve to feed the photosensitive sheet N to the feed-in portion 400a of the drum 400A.

Accordingly, the distal end portions of the fourth and fifth guides 409 and 411 merge at a predetermined angle at the feed-in portion 400a.

Note that heaters (not shown) for preheating the fed sheets P and N may respectively be arranged at proper portions of the fourth and fifth guides 409 and 411.

A scraper 412 is arranged at the feed-out portion 400b of the rotary drum 400A. The scraper 412 is made of Teflon. A sharp-edged portion of the scraper 412 is arranged to oppose the feed-out portion 400b and is brought into contact with the drum 400A so as to separate the fed sheets P and N which overlap each other from the drum 400A.

Reference numeral 413 denotes a curl correcting guide arranged at the feed-out portion 400b of the rotary drum 400A and having an end portion as an inlet portion 413a located near the feed-out portion 400b of the rotary drum 400A. The overall guide 413 is bent so as to form a spiral shape. The bending direction of the guide 413 is opposite to that of a contact portion between the endless belt 401 and the drum 400A. In addition, the inlet portion 413a is directed along a surface of the drum 400A at the feed-out portion 400b.

With this arrangement, overlapped sheets P and N are smoothly transferred from the drum 400A to the curl correcting guide 413 and are caused to pass through the guide 413, thereby correcting curling of the overlapped sheets P and N, which is caused by the drum 400A. A sixth feed roller pair 414 is arranged midway along the guide 413. This roller pair 414 comprises a one-way clutch. Even if the sheets P and N are pulled in the feed direction at high speed, the roller pair 414 can properly follow the movement.

Reference numeral 415 denotes a dark box type light-shielding roller unit arranged at the outlet portion of the curl correcting guide 413. The unit 415 has slits formed in the left and right walls in the drawing so as to allow the overlapped sheets P and N to pass therethrough. A slit plate 415a is arranged in the unit 415 so as to partition it into left and right chambers. A slit is also formed in a central portion of the slit plate 415a so as to allow the sheets P and N to pass therethrough. In addition, two pairs of sliding rollers 415b and 415c and the like are respectively arranged in the chambers partitioned by the slit plate 451a in the unit 415.

Alignment lines a and b for the respective pairs of sliding rollers 415b and 415c are not parallel to each other, but are set to define a certain angle, thus preventing light from directly passing through the unit 415. Note that a member having lubricating properties, such as a velvet member, is attached to the surface of each of the sliding rollers 415b and 415c. In addition, a sixth guide 416 is arranged at the outlet side of the unit 415.

Reference numeral 417 denotes an air intake section arranged at a lower portion of the casing of the thermal development/transfer device D. A light-shielding plate 417b is arranged so as to cover an air intake port 417a. This arrangement allows only air to be externally taken in, while preventing external light from being incident into the casing. An air outlet port 418 having a fan is arranged at an upper portion of the casing. Similar to the air intake section 417, the air outlet portion 418 has a structure for preventing external light from being incident into the casing.

Note that at least a portion from the photosensitive element feed device A to the exposure device B and the thermal development/transfer device D must be completely shielded from external light. Therefore, they are preferably formed into an integral unit so as to effectively shield external light.

Figure 3A:
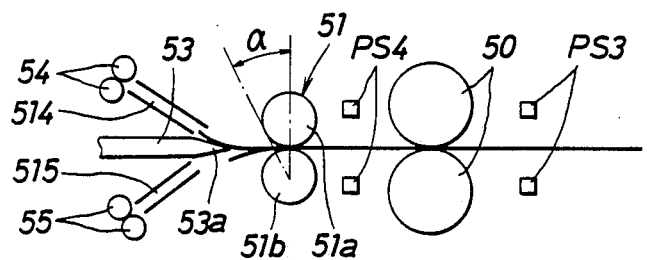
FIGS. 3A and 3B are views for explaining a meander correcting/separating section.

Reference symbol E denotes a sheet separating device arranged at the outlet side of the sixth guide 416. Reference numeral 50 denotes a meander correcting roller pair arranged at the outlet portion of the guide 416; and 51, a swing roller pair arranged at the sheet feed-out side of the roller pair 50. A photosensor PS3 is arranged at the sheet feed-in side of the correcting roller pair 50, while a photosensor PS4 is arranged at the sheet feed-out side of the roller pair 50 (refer to FIG. 3). The correcting roller pair 50 is designed to be started when the leading ends of the overlapped sheets P and N reach the position of the photosensor PS3 and a predetermined period of time (e.g., 8.5 seconds) has elapsed upon detection.

Figure 3B:
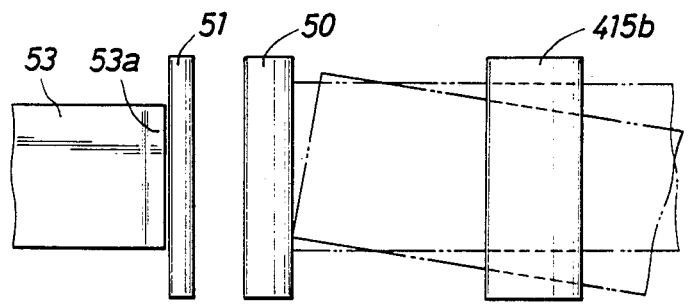

In addition, an upper swing roller 51a is designed to be tilted in the feed direction at an angle with respect to the rotary shaft of a lower swing roller 51b as the center in response to a predetermined signal, as shown in FIG. 3. This swing is performed by a pulse motor.

Reference numeral 53 denotes a separator arranged at the sheet outlet side of the swing roller pair 51 and having a distal end formed into a wedge-like shape. A sharp-edged portion 53a of the distal end of the separator 53 is located so as to oppose the overlapped sheets P and N fed from the swing roller pair 51. Reference numerals 54 and 55 denote seventh and eighth feed roller pairs, respectively, arranged at upper and lower sides of a rear portion of the separator 53 in oblique directions, for respectively discharging the separated sheets P and N outside the sheet separating device E; and 514 and 515, guide plates for guiding the sheets separated by the separator 53 to the roller pairs 54 and 55. In the apparatus of this embodiment, the separation angle of two sheets can be adjusted by changing the mounting angles or shapes of the guide plates.

The separator 53, the feed roller pairs 54 and 55, and the like are incorporated in an integral frame 56, and are designed to be movable, as a whole, in a direction indicated by the arrow X within a predetermined range. With this arrangement, even if a sheet is jammed in a portion near the separator 53, the jammed sheet can be easily removed by moving the frame 56 in the direction indicated by the arrow X and separating the distal end of the separator 53 from the swing roller pair 51. For this purpose, a maintenance hole or the like is formed in a cabinet near the separator 53.

In addition, a similar maintenance hole is formed in a proper portion of the cabinet so as to remove a jammed sheet P or N on a line other than the above-described line.

Note that if a ladder type chain is employed as a chain used for each driving mechanism described above, a winding diameter can be reduced.

FIG. 4 is a timing chart for the separating device E.

When a start button (not shown) for starting a recording operation is depressed, a photosensitive sheet N is fed from the feed port of the thermal developable photosensitive medium feed device A and is fed along the first and second guides 12 and 21.

At the same time, an image-receiving sheet P is fed from the feed port 30 of the image-receiving element feed device C by the third roller pair 31, and is stopped at a given portion when its leading end passes through the photosensor PS2 and a predetermined period of time has elapsed. The third roller pair 31 comprises clutch and brake mechanisms, and is designed such that its drive and stop operations are controlled by a signal from a control section (not shown).

In the meantime, the photosensitive sheet N which is passing through the first guide 12 is exposed by the FOT or the like in the exposure device B, thus forming a latent image. The latent image constitutes a so-called mirror image in which an erect image is inversed. Thereafter, the exposed sheet N is fed by the second feed roller pair 20 along the second guide 21. When the microswitch MS1 detects the sheet N, a detection signal is transmitted to the control section so as to set the clutch and brake of the third roller pair 31, which have been set in a stop state, in a drive state and start feeding the sheet P.

With this operation, the image-receiving sheet P is guided by the fourth guide 408 to the feed-in portion 400a of the rotary drum 400A, and, similarly, the photosensitive sheet N is guided by the fifth guide 411 to the same position, so that both the sheets P and N are overlapped at the feed-in portion 400a.

In this case, it is important that the sheets P and N are overlapped while the leading end of the sheet P is slightly protruded from that of the sheet N (e.g., 3 to 10 mm) at the beginning of overlapping. In order to obtain such a timing, the position of the microswitch MS1, the feed speeds of the feed roller pairs 31 and 410, and the lengths of the guides 409 and 411 are set in advance.

The sheets P and N advancing to the feed-in portion 400a of the rotary drum 400A are then pulled from the feed-in portion 400a into a portion between the drum 400A and the endless belt 401, and are clamped therebetween to be transferred.

At this time, the rotary drum 400A is heated by the internal heater 400B such that its surface temperature is adjusted to be about 130° to 155° C. Therefore, the sheets P and N are heated by the drum 400A and the endless belt 401 while they adhere to each other. As a result, the latent image on the photosensitive sheet N is developed, and the developed image is transferred onto the image-receiving sheet P. The image transferred onto the sheet P is inversed to be an erect image.

In this case, an urging force applied from the endless belt onto the sheets P and N is gradually increased toward the position of the pressing roller 406. The position of the pressing roller 406 is properly set in accordance with humidity in the air.

Image transfer is completed by the time when the sheets P and N reach the feed-out portion 400b of the rotary drum 400A. The sheets P and N fed from the feed-out portion 400b of the drum 400A adhere to each other and to the drum 400A. The sheets P and N are then integrally separated from the drum 400A by the scraper 412 at the feed-out portion 400b.

The sheets P and N are fed to the curl correcting guide 413 immediately after the separation. While the sheets P and N advance along the guide 413, they are bent in a direction opposite to the bending direction of the rotary drum 400A, thereby correcting a curling tendency provided by the drum 400A. The sheets P and N are then fed by the sixth feed roller pair 414 to the light-shielding roller unit 415.

External air is taken in the device section D from the air intake section 417 during the above-described operation so as to cool the feed-out portion 400b of the rotary drum 400A and the curl correcting guide 413. The sheets P and N are fed from the feed-out portion 400b and are forcibly cooled (about 120° C. or less). Thereafter, the development operation is stopped. In addition, the internal air whose temperature is increased is exhausted from the air outlet port 418 by a fan.

The sheets P and N enter the light-shielding roller unit 415 from the slit formed in the wall on the right side in the drawing, and are then fed by the sliding roller pairs 415c and 415b so as to be transferred to the sixth guide 416 through the slit formed in the left wall.

The leading ends of the sheets P and N are transferred from the guide 416 and are brought into contact with the correcting roller pair 50 to be stopped. Since the sliding roller pairs 415a and 415c are kept rotating, they idle while urging the sheets P and N against the roller pair 50. In this case, if the directions of the sheets P and N are skewed, this skew can be corrected (refer to FIG. 3A).

In addition, the sheets P and N are detected by the photosensor PS3 immediately before the leading ends of the sheets P and N are brought into contact with the correcting roller pair 50, so that the roller pair 50 is started when a predetermined time T1 (e.g., 8.5 seconds) has elapsed upon detection (refer to FIG. 4). With this operation, meander of the sheets P and N is corrected, and sheet feed is resumed. Thus, the sheets P and N are fed to the swing roller pair 51 which are rotated by an AC motor together with the roller pair 50, and their leading ends are sent out from the roller pair 51. Of the sent out leading ends of the sheets P and N, the leading end of the upper image-receiving sheet P protrudes from the other. Therefore, the leading end of the sheet P is placed on the upper side of the separator 53. In addition, the sheets P and N are detected by the photosensor PS4 in the course of reaching the swing roller pair 51. The pulse motor causes the swing roller pair 51 to be tilted downward at the angle shown in FIG. 3A when a predetermined time T2 has elapsed upon detection. This angle is restricted by microswitches MS2 and MS3. As a result, the sheets are bent downward. However, since their leading ends are held by the separator 53, the sheet N is separated from the sheet P.

The sharp-edged portion 53a of the separator 53 then separates the sheets P and N as they advance. The separated image-receiving sheet P is sent outside the apparatus by the seventh feed roller pair 54, whereas the photosensitive sheet N is discharged into a dust box by the eighth feed roller pair 55. FIG. 4 is a timing chart for the above-described separating operation.

Note that each roller and the drum are kept operated for 30 minutes after the main switch is turned off in order to prevent burning.

In the above embodiment, the sheets P and N are separated from each other by tilting the swing roller pair 51. However, the separator 53 may be moved upward or pivoted while the swing roller pair 51 is set in a stationary state. Alternatively, these methods may be employed at the same time.

In addition, when the sheets P and N are overlapped, the leading end of the sheet P is caused to protrude from that of the sheet N. However, contrary to this, the leading end of the sheet N may be caused to protrude from that of the sheet P.

A photosensitive element used in the present invention can be obtained by coating/drying a material containing a pigment polymer and a silver halide on a support member by using a hydrophilic binder as a binder.

An image-receiving element can be manufactured by coating an image-receiving layer containing a polymer for fixing a thermal transfer pigment diffused from a thermal developable photosensitive medium on a support member, such as a sheet of paper or other synthetic polymer sheets.

The present invention can be applied to photosensitive pressure-sensitive thermal development materials or thermal development apparatus therefor disclosed in Japanese Patent Laid-Open (Kokai) Nos. 62-253140 and 62-249164.

As described above, according to the present invention, upon completion of development and transfer of overlapped photosensitive and image-receiving sheets, incorrect positions of the sheets are forcibly corrected in a process prior to a sheet separating operation, so that the separating operation in the separating device can be performed without a hindrance, thus minimizing occurrence of troubles, such as a jam and incomplete separation of sheets.

A second embodiment will be described below.

Figure 7A:
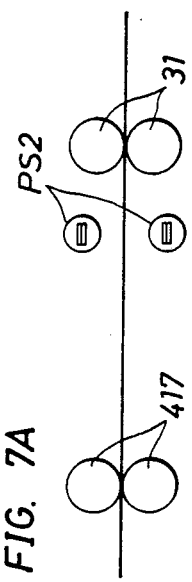
FIGS. 7A, 7B, and 7C are views for explaining a meander correcting unit according to a second embodiment of the present invention.

In the second embodiment, skews of image-receiving and photosensitive sheets are corrected before they enter a developing section. FIG. 7A shows a main part of the second embodiment. In this embodiment, a lubricating member, such as a velvet member, is formed on the surface of a third feed roller pair 31, and a meander correcting roller pair 417 is arranged midway along a fourth guide 409 (refer to FIG. 7A).

Figure 7B:
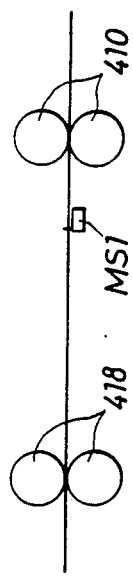

Similarly, a lubricating member, such as a velvet member, is formed on the surface of a fifth feed roller pair 410, and a meander correcting roller pair 418 is arranged midway along a fifth guide 411 (refer to FIG. 7B).

Figure 7C:
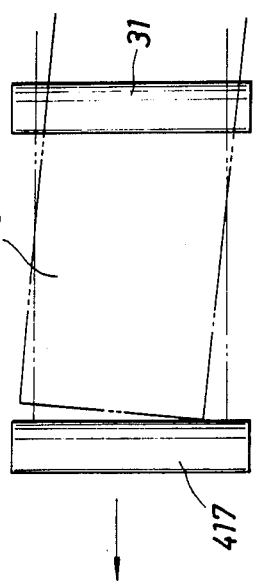
Figure 5:
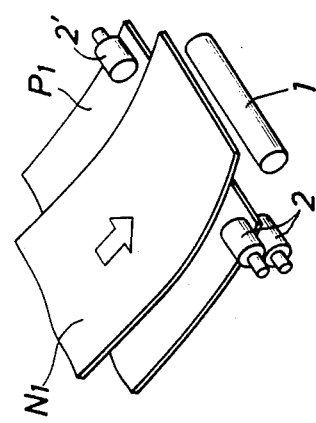
FIGS. 5 and 6 are views showing separating sections of conventional thermal development image forming apparatuses.
Figure 6:
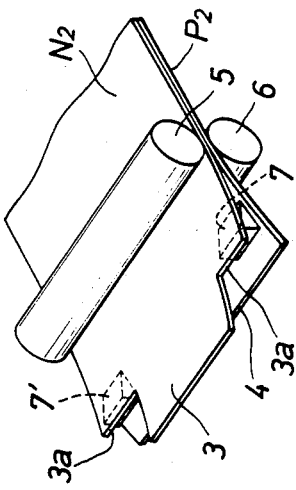

Note that the same reference numerals in FIGS. 7A to 7C denote the same parts as in the embodiment shown in FIG. 1. In addition, other arrangements are the same as those in the embodiment shown in FIG. 1.

FIG. 8 is a timing chart for explaining an operation timing of the correcting roller pairs 417 and 418.

According to the apparatus in this embodiment, when a start button (not shown) is depressed, a photosensitive sheet N is fed from a feed port 10 of a thermal developable photosensitive medium feed device A and is fed along a first guide 12.

Meanwhile, an image-receiving sheet P is fed from a feed port 30 of an image-receiving element feed device C. The leading end of the sheet P passes through a photosensor PS2, and is brought into contact with the meander correcting roller pair 417, which is set in a stop state, to be stopped. Since the third roller pair 31 is kept rotated, it idles while urging the sheet P against the correcting roller pair 417. If the direction of the sheet P is skewed at this time, this skew is corrected (refer to FIG. 7C). The third roller pair 31 is stopped when a predetermined time Tl (e.g., 8.5 seconds) has elapsed after the leading end of the sheet P is detected by the photosensor PS2, and hence the sheet P is stopped at the corresponding position.

In the meantime, the photosensitive sheet N which is passing through the first guide 12 is exposed by an FOT or the like in an exposure device B, thus forming a latent image. The latent image constitutes a so-called mirror image in which an image is inversed with respect to an erect image. Thereafter, the sheet N is guided by a second feed roller pair 20 to a second guide 21, and is fed by the fifth feed roller pair 410 so as to turn on a microswitch MSl. The sheet N is further fed to be brought into contact with the meander correcting roller pair 418 set in a stop state, and is stopped. Similar to the above-described case of the photosensitive sheet N, since the fifth roller pair 410 is kept rotated, it idles while urging the sheet P against the correcting roller pair 417. If the direction of the sheet P is skewed at this time, the skew is corrected.

When the microswitch MSl is turned on by the photosensitive sheet N, the detection signal is transmitted to a control section. When a predetermined time T2 (e.g., 8.5 seconds) has elapsed upon detection, the meander correcting roller pairs 417 and 418 are set in a drive state, and feed of the sheets P and N is resumed.

As a result, the directions of the image-receiving and photosensitive sheets P and N are corrected, and the sheets are fed to a feed-in portion 400a of the rotary drum 400A to be overlapped.

FIG. 9 shows a main part of a third embodiment. In this embodiment, an abutment member 419 and a normal feed roller pair 420 are arranged in place of the meander correcting roller pairs 417 and 418 in the second embodiment. A hook 419a is formed on the distal end of the abutment member 419. The abutment member 419 is supported by a proximal portion 419b so as to be pivoted in a direction indicated by the arrow.

When an image-receiving sheet P or a photosensitive sheet N is fed by a third or fifth roller pair 31 or 410, the leading end of the sheet P or N is hooked by the hook 419a to be stopped. As a result, skews of the sheet P or N are corrected in the same manner as described in the second embodiment. Thereafter, the abutment member 419 is pivoted in the direction indicated by the arrow, so that the hooked state of the hook 419a is released, and the sheet P or N are fed by a feed roller pair 420 to a rotary drum 400A.

Note that the pivotal movement of the abutment member 419 and the ON/OFF timing of the feed roller pair 420 are set to provide the same effect as the meander correcting roller pairs 417 and 418 in the second embodiment.

FIG. 10 shows a main part of a fourth embodiment. In this embodiment, skews are corrected before image-receiving and photosensitive sheets P and N are fed to a rotary drum 400A after they are overlapped. For this reason, a correcting unit of this embodiment is arranged at a merging portion of fourth and fifth guides 409 and 411.

In the fourth embodiment, sheets P and N are overlapped with the leading end of the sheet P protruding from that of the sheet N by a predetermined width, and are fed in a d direction. Convey of the sheets P and N is stopped when the leading end of the sheet P reaches a feed roller pair 421. The sheets P and N are then clamped by correcting rollers 422 each having a lubricating member, such as a velvet member, attached to its surface, so that the sheets P and N are fed in an e direction perpendicular to the d direction upon rotation of the rollers 422 and their side edges are brought into contact with an abutment plate 423. As a result, the side edges of the sheets P and N are aligned, and hence skews in the feed direction are corrected. Thereafter, the feed roller pair 421 clamps the sheets P and N and feeds them toward the drum 400A upon its rotation.

According to the fourth embodiment, therefore, skews of the sheets P and N can be corrected after the sheets P and N are overlapped with their leading ends being shifted from each other by a predetermined width. In addition, skews of the sheets P and N can be independently corrected by arranging the correcting unit of this embodiment for each of the fourth and fifth guides 409 and 411.

According to a modification of the fourth embodiment, instead of using the correcting rollers 422, skews can be corrected by dropping the sheets P and N and bringing them into contact with the abutment plate 423. In this case, the upper feed roller of the feed roller pair 421 must be temporarily retreated upward.

In the above-described embodiments, a thermal developing section comprising a drum and belt is used. However, the thermal developing section is not limited to this. Various types of thermal developing sections, such as a belt-belt type thermal developing section disclosed in Japanese Patent Laid-Open (Kokai) No. 61-153651, a sheet-like heater-pressing platen type thermal developing section disclosed in Japanese Patent Laid-Open (Kokai) No. 61-184544, and a belt-heating plate type thermal developing section disclosed in Japanese Patent Laid-Open (Kokai) No. 61-184545 can be used.

As described above, according to the present invention, skews of photosensitive and image-receiving sheets can be corrected before they are fed to a thermal developing section so that a properly positioned transfer image can be formed on the image-receiving sheet without a skew.

Figure 11:
FIG. 11 is a front view showing a crowning roller.

In the conventional apparatuses, in order to prevent an offset of the endless belt 401, a proper number of rollers of the rollers around which the endless belt 401 is wound are constituted by crowning rollers. As shown in FIG. 11, a crowning roller 1 is designed to have a central portion whose diameter is larger than that of each side portion, so that the tension of the belt becomes maximum at the central portion. Since a belt wound around a roller has a tendency to be shifted to a portion where tension is large, the position of the endless belt can be always corrected so as to be shifted to the central portion.

In practice, however, the above offset cannot be corrected by only a countermeasure using crowning rollers for the following reasons.

(1) Since thermal shrinkage of each member in the apparatus varies in a complex manner, conditions of a belt line are changed during rotation of the rotary drum depending on a heated/non-heated state of the drum.

(2) Expansion/contraction properties of the belt locally vary.

(3) Overlapped photosensitive and image-receiving materials having a total thickness of 0.4 mm are intermittently inserted between the rotary drum and the belt. Hence, conditions are changed upon each insertion.

In consideration of the above situation, therefore, a fifth embodiment employs a mechanism capable of reliably correcting an offset of a belt regardless of a change in condition, such as a change from a heated condition to a non-heated condition of a rotary drum.

Figure 12:
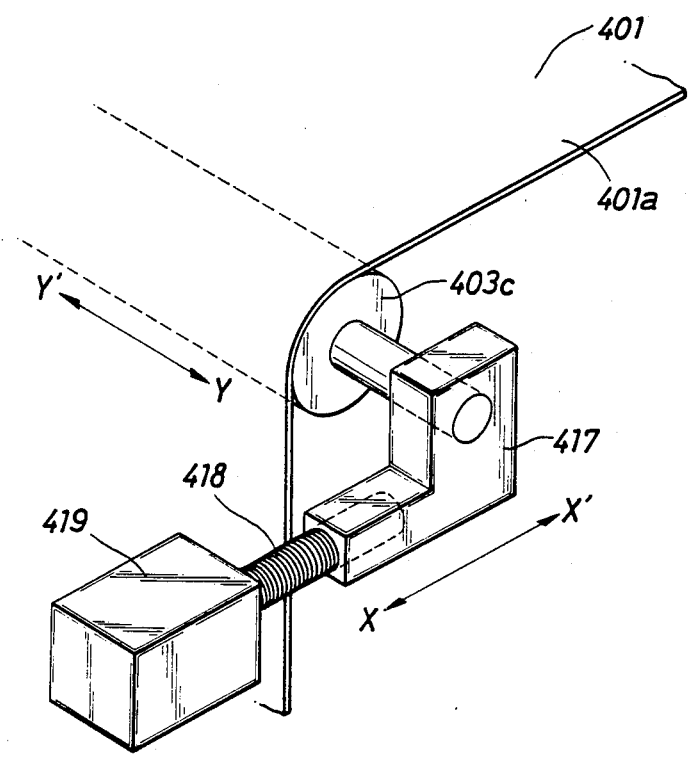
FIG. 12 is a view for explaining belt offset correction in the first embodiment of the present invention.

FIG. 12 shows a main part of the fifth embodiment. In this embodiment, a screw rod 418 is reversibly screwed into a bearing 417 on one side of one of rollers around which an endless belt 401 is wound, e.g., a holding roller 403c, so that the bearing 417 is moved in a direction indicated by the X—X' direction by rotating the screw rod 418 clockwise/counterclockwise so as to tilt the shaft of the roller 403c.

Other arrangements in the fifth embodiment are the same as those shown in FIG. 1.

The shaft of the holding roller 403c is moved upon movement of the bearing 417, so that one side of the holding roller 403c increases/decreases the tension of one side of the belt 401. More specifically, if the screw rod 418 is rotated clockwise, the bearing 417 is pulled in the X direction so as to increase the tension of a one-side portion 401a of the belt 401. On the contrary, if it is rotated counterclockwise, the tension is decreased.

Figure 13A:
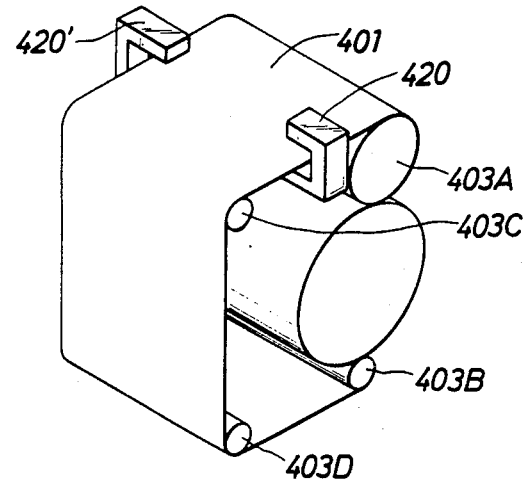
FIGS. 13A and 13B are views for explaining detection of a belt offset.
Figure 13B:
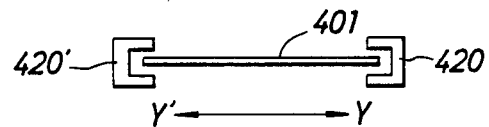

The screw rod 418 is rotated by a driving motor 419 incorporating a reduction gear mechanism. As shown in FIGS. 13A and 13B (the mechanism shown in FIG. 12 is omitted), the driving motor 419 is controlled by signals (from photosensors 420 and 420' arranged at both the sides of the endless belt 401. More specifically, if the belt 401 is offset in a direction indicated by the arrow Y, the photosensor 420 detects the offset and causes the driving motor 419 to be rotated counterclockwise by a predetermined amount, thereby decreasing the tension of the one-side portion 401a of the belt 401.

Although the belt 401 is offset toward a portion where tension is large, it does not quickly respond to a change in tension. Therefore, if the offset of the belt 401 is not corrected when the positions of both the end portions of the belt 401 are confirmed again by the photosensors 420 and 420' after a given period of time, e.g., five minutes, a signal is transmitted to the driving motor 419 so as to further decrease the tension of the one-side portion 401a of the belt 401. With this operation, confirmation and correction of the position of the belt 401 can be automatically performed every five minutes.

In the above embodiment, detection and correction of both the end portions of the belt 401 are intermittently performed every predetermined period of time. However, the positions of the end portions of the belt 401 can be detected in an analogous manner, and hence correction can be continuously performed.

Figure 14:
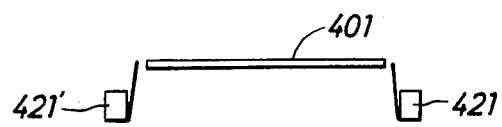
FIG. 14 is a view for explaining detection of a belt offset in tho third embodiment.

FIG. 14 shows a case wherein microswitches 421 and 421' are used in place of the photosensors 420 and 420' in the fifth embodiment. In this case, when the microswitches 421 and 421' are directly brought into contact with both the end portions of the belt 401, an offset of the belt 401 is detected. A mechanism for correcting the offset by using a detection signal is the same as that described in the fifth embodiment.

According to a sixth embodiment (not shown), the mechanism for moving the bearing 417 in the direction indicated by the arrow X—X' shown in the fifth embodiment is attached to a bearing on one side of the pressing roller 406. In this case, an offset of the belt 401 is detected by the detection scheme described in the fifth or sixth embodiment, and the pressing force of one side of the pressing roller 406 with respect to a rotary drum 400A is increased/decreased by using the output detection signal. In this case, if the pressing force with respect to the drum 400A is decreased, the belt 401 is offset toward one side of the pressing roller 406. If it is increased contrary to the above case, the belt 401 is moved away from that portion.

In the fifth and sixth embodiments, the shaft of the holding roller 403C is tilted. However, an offset of the belt 401 can be corrected by axially moving the shaft. In addition, as an actuating means for the bearing 417, a solenoid, or a cylinder, such as a hydraulic or pneumatic cylinder, can be used in place of the one described above.

In the conventional apparatuses, a thermal developing section is compact and a feed speed therein is relatively low so as to realize satisfactory thermal development. Since a feed speed at which both sheets are fed in the thermal developing section is set in accordance with the feed speed in thermal development, a processing time per sheet is inevitably prolonged.

In an embodiment to be described below, the feed speed at which photosensitive and image-receiving sheets N and P are fed to a developing section is set to be higher than that in the thermal developing section, thereby shortening the processing time per sheet.

Figure 15:
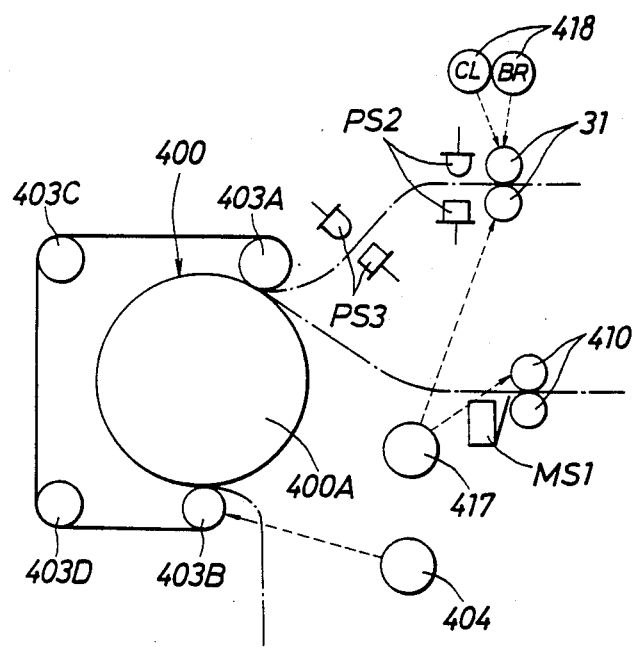
FIG. 15 is a view showing an arrangement wherein feed roller pairs are driven by a driving motor which can be rotated both at high and low speeds.

More specifically, in this embodiment, feed roller pairs 31 and 410 are driven by a driving motor 417 which can be rotated at high and low speeds, as shown in FIG. 15. In addition, a clutch/brake 418 is provided to the feed roller pair 31 so that rotation of the driving motor 417 can be stopped/held or set in a free state even during continuous driving of the driving motor 417.

AC servo motors (frequency control or PWM control) of the same type are preferably used as the driving motor 417 and driving motor 404 for driving a rotary drum 400A. However, the present invention is not limited to this. If motors of the same type are used, the following advantage can be provided. Since various types of sheets are used, a development time in the rotary drum 400A must be changed depending on a type. When the rotating speed of the drum 400A is changed for the above-described reason, control for changing the rotating speed of the driving motor 417 so as to correspond to that of the drum 400A is facilitated.

Other arrangements in this embodiment are the same as those shown in FIG. 1.

When a start button (not shown) for starting a copying operation is depressed, a photosensitive sheet N is fed from a feed port of a thermal developable photosensitive medium feed device A, and is fed along a first guide 12.

At the same time, the clutch/brake 418 is set in a clutch ON/brake OFF state, and the motor 417 is rotated at high speed so as to drive the third feed roller pair 31. Hence, an image-receiving sheet P is fed from a feed port 30 of an image-receiving element feed device C. When the fed sheet P passes through a photosensor PS2, its feed operation is confirmed, and hence the sheet P is fed along a fourth guide 409 at high speed. When the sheet P is detected by a photosensor PS3, the clutch/brake 418 is set in a clutch OFF/brake ON state so as to stop the sheet P at this point. In this case, since inertial motion of the sheet P is quickly and reliably suppressed, the sheet P is stopped at an accurate position.

In the meantime, the photosensitive sheet N passing through the first guide 12 is exposed by an FOT of an exposure device B to form a latent image. The latent image is a so-called mirror image in which an erect image is inversed. Thereafter, the exposed sheet N is guided by a second feed roller pair 20 to a second guide 21. When a microswitch MS1 detects the sheet N, its detection signal is transmitted to a control section, so that the clutch/brake 418 is set in the clutch ON/brake OFF state. As a result, the third roller pair 31 which is in a stop state is set in a drive state so as to resume feed of the sheet P. The motor 417 is set in a low-speed mode when a predetermined period of time has elapsed after this. As a result, feed speeds of the sheets P and N are matched with the rotating linear speed of the rotary drum 400A, and the sheets are overlapped at the position of a feed-in portion 400a.

The leading end of the image-receiving sheet P slightly protrudes from that of the photosensitive sheet N (e.g., 3 to 10 mm) in the beginning of the overlapping operation. In order to obtain such a timing, the microswitch MS1 is arranged at a predetermined position.

Figure 16:
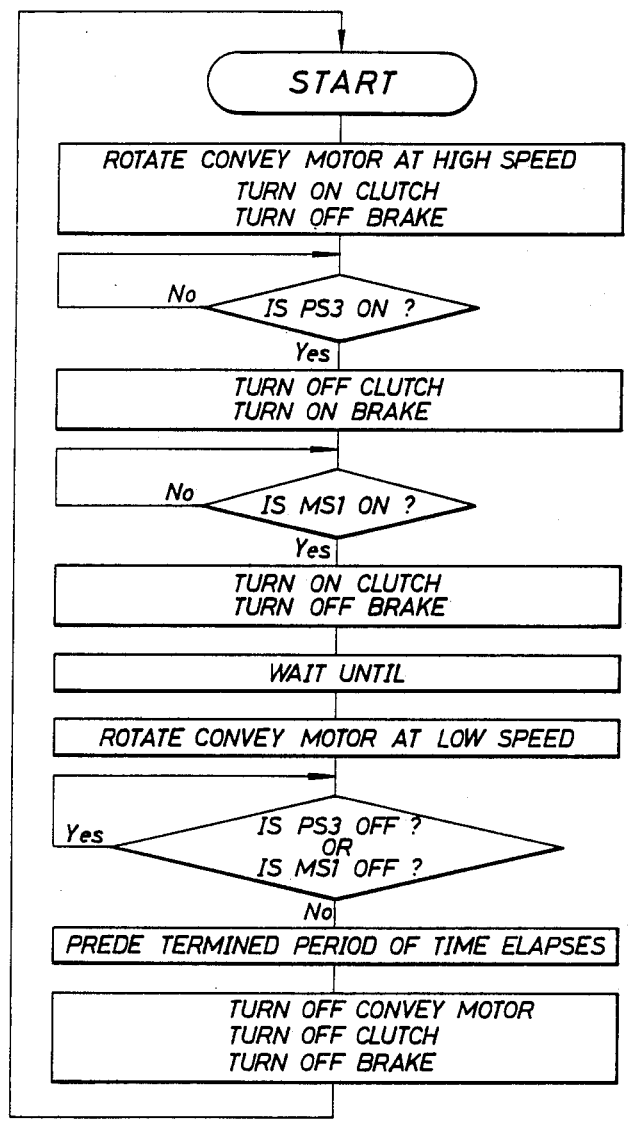
FIG. 16 is a flow chart for explaining an operation of the arrangement in FIG. 15.

Note that when the trailing end of the sheet P passes through the photosensor PS3 or the trailing end of the sheet N passes through the microswitch MS1, and a predetermined period of time elapses, the motor 417 is stopped, and at the same time, the clutch/brake 418 is set in a clutch OFF/brake OFF state (refer to FIG. 16).

In this embodiment, the clutch/brake 418 is provided to the feed roller pair 31. However, a clutch/brake 404 similar to the clutch/brake 418 may be provided to the motor 404 so as to obtain only a low-speed driving force for the feed roller pairs 31 and 410.

According to still another embodiment, a member having a low friction resistance, such as a velvet member, is attached to the surfaces of feed roller pairs 30 and 410. In this embodiment, sheets P and N are fed at high speed until they are fed to a drum 400A. Since the feed roller pairs 31 and 410 idle with respect to the sheets P and N after they are fed the drum 400A, forcible insertion feed of the sheets P and N to the drum 400A can be prevented. Hence, the sheets P and N are fed in accordance with the low rotating linear speed of the drum 400A. Therefore, the feed roller pairs 31 and 410 can be continuously rotated at high speed.

Figure 17:
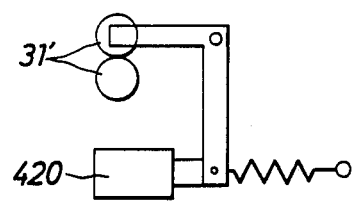
FIG. 17 shows still another embodiment of the present invention.

FIG. 17 shows still another embodiment. In this embodiment, a clamping operation of a feed roller pair 31' is released upon actuation of a solenoid 420 when sheets P and N are fed to a drum 400A. Thereafter, the sheets P and N are fed upon rotation of the drum 400A in the same manner as described in the previous embodiment. Therefore, in this embodiment too, a feed roller pair 409 need not be rotated at low speed, and hence can be kept rotated at high speed.

The following method can be presented as still another embodiment. That is, a power source of a driving motor 417 for feed roller pairs 31 and 410 is turned off when the leading ends of sheets P and N are fed to a rotary drum 400A, so that the feed roller pairs 31 and 410 are set in a free state (absence of driving and control forces), thus rotating the feed roller pairs 31 and 410 at low speed upon pulling of the sheets P and N by the drum 400A.

Although the present invention has been described in terms of the presently preferred embodiment, it is to be understood that such disclosure is not to be interpreted as limiting. Various attentions and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A thermal development image forming apparatus comprising:
   exposure means for forming a latent image on a photosensitive sheet by exposing the photosensitive sheet;
   image-receiving sheet feeding means for overlapping the exposed photosensitive sheet on an image-receiving sheet;
   developing and transferring means for heating and pressing the overlapped sheets so as to develop the latent image on the photosensitive sheet to transfer the developed image onto the image-receiving sheet;
   sheet separating means for separating the photosensitive sheet from the image-receiving sheet after the transfer of the developed image onto the image-receiving sheet; and
   correction means for correcting the skew of the sheets with respect to the feed direction prior to the separation of the sheets by the sheet separating means.

2. An apparatus according to claim 1, wherein said correcting means comprises abutment means for abutting a leading edge of a sheet and means for providing an abutment force to said abutment means.

3. An apparatus according to claim 2, wherein said means for providing the abutment force comprises a feed roller for feeding a sheet, and said abutment means comprises a correcting roller for causing a leading edge of a sheet fed from said feed roller to abut thereagainst so as to stop the sheet for a predetermined period of time while said roller idles, and feeding the sheet thereafter.

4. An apparatus according to claim 2, wherein said means for providing the abutment force comprises a feed roller for feeding a sheet, and said abutment means comprises a correcting roller for causing a leading edge of a sheet fed from said feed roller to abut thereagainst so as to stop the sheet for a predetermined period of time while said feed rollers idles to correct a skew of the sheet, and feeding the sheet thereafter.

5. An apparatus according to claim 2, wherein said means for providing the abutment force comprises a feed roller for feeding a sheet, and said abutment means comprises a correcting plate member, arranged on a sheet feed path, for causing a leading edge of the sheet fed from said feed roller to abut thereagainst so as to stop the sheet for a predetermined period of time while said feed roller idles to correct a skew of the sheet, said correcting means being retreated from the sheet feed path after the correction.

6. An apparatus according to claim 2, wherein said means for providing the abutment force comprises a correcting roller for moving a sheet in a direction perpendicular to a feed direction thereof, and said abutment means comprises an abutment plate member abutting an edge of the sheet parallel to the sheet feed direction.

7. A thermal development image forming apparatus comprising:
   exposure means for forming a latent image on a photosensitive sheet by exposing the photosensitive sheet;
   image-receiving sheet feeding means for overlapping the exposed photosensitive sheet on an image-receiving sheet;
   developing and transfer means for heating and pressing the overlapped sheets so as to develop the latent image on the photosensitive sheet to transfer the developed image onto the image-receiving sheet;
   sheet separating means for separating the photosensitive sheet from the image-receiving sheet after the developed image has been transferred onto the image-receiving sheet; and
   correction means for correcting the skew of the sheets with respect to the feed direction prior to the developing of the latent image on the photosensitive sheet and the transferring of the developed image onto the image-receiving sheet.

8. A thermal development image forming apparatus comprising:
   exposure means for forming a latent image on a photosensitive sheet by exposing the photosensitive sheet;
   image-receiving sheet feeding means for overlapping the exposed photosensitive sheet on an image-receiving sheet;
   developing and transferring means for heating and pressing the overlapped sheets so as to develop the latent image on the photosensitive sheet and transfer the developed image onto the image-receiving sheet;
   sheet separating means for separating the photosensitive sheet from the image-receiving sheet after transfer of the developed image onto the image-receiving sheet; and
   correction means for correcting the skew of the sheets with respect to the feed direction prior to the developing of the latent image on the photosensitive sheet and the transferring of the developed image onto the image-receiving sheet, the correction means comprising an abutment plate abutting a leading edge of a sheet parallel to the sheet feed direction and means for providing an abutment force to said abutment plate by using the weight of the parallel sheet and causing the sheet to drop.

9. A thermal development image forming apparatus comprising:
   exposure means for forming a latent image on a photosensitive sheet by exposing the photosensitive sheet;
   image-receiving sheet feeding means for overlapping the exposed photosensitive sheet on an image-receiving sheet;
   developing and transferring means for heating and pressing the overlapped sheets so as to develop the latent image on the photosensitive sheet and transfer the developed image onto the image-receiving sheet, the developing and transferring means comprising:
a rotary drum and a belt urged against the rotary drum for feeding the overlapped sheets therebetween and for heating and pressing the sheets,
detecting means for detecting the offset of the belt, and means for correcting the offset of the belt by moving a holding roller holding the belt when the offset of the belt is detected by the detecting means;
sheet separating means for separating the photosensitive sheet from the image-receiving sheet after transfer of the developed image onto the image-receiving sheet; and
correction means for correcting the skew of the overlapped sheets with respect to the feed direction prior to the separation of the sheets by the sheet separating means.

10. An apparatus according to claim 9, wherein said detecting means comprises side edge position detecting means for detecting the positions of the side edges of said belt and for detecting the offset of said belt from the detected positions.

11. An apparatus according to claim 10, wherein said side edge position detecting means comprises one of a photosensor and a microswitch.

12. An apparatus according to claim 9, wherein said means for correcting the offset of said belt comprises a rotary shaft connected to said holding roller, said rotary shaft being tilted to correct the offset of the belt.

13. An apparatus according to claim 9, wherein said meeans for correcting the offset of said belt comprises a rotary shaft connected to said holding roller, said rotary shaft being axially displaced to correct the offset of the belt.

* * * * *

UNITED STATES PATENT AND TRADEMARK OFFICE
CERTIFICATE OF CORRECTION

PATENT NO.   :   4,975,716

DATED        :   December 4, 1990

INVENTOR(S)  :   Hirotaka Hara et al.

It is certified that error appears in the above-identified patent and that said Letters Patent is hereby corrected as shown below:

ON TITLE PAGE: Inventors, change "Kirotaka" to --Hirotaka--.

Column 1, line 51, change "NO. 63-159850" to --No. 63-159852--.

Column 13, line 51, after "as" Delete [the].

Claim 13, column 18, line 16, change "meeans" to --means--.

Signed and Sealed this

Eighteenth Day of August, 1992

*Attest:*

DOUGLAS B. COMER

*Attesting Officer*        Acting Commissioner of Patents and Trademarks